(12) United States Patent
Squatrito

(10) Patent No.: US 10,049,548 B2
(45) Date of Patent: Aug. 14, 2018

(54) CLIPPABLE AIR CONDITION MONITOR DEVICE

(71) Applicant: Eric Squatrito, Miramar Beach, FL (US)

(72) Inventor: Eric Squatrito, Miramar Beach, FL (US)

(*) Notice: Subject to any disclaimer, the term of this patent is extended or adjusted under 35 U.S.C. 154(b) by 0 days.

(21) Appl. No.: 15/359,622

(22) Filed: Nov. 23, 2016

(65) Prior Publication Data

US 2018/0144596 A1 May 24, 2018

(51) Int. Cl.
| | |
|---|---|
| *G08B 21/00* | (2006.01) |
| *G08B 21/02* | (2006.01) |
| *G01K 1/14* | (2006.01) |
| *G01K 1/02* | (2006.01) |
| *G01W 1/17* | (2006.01) |
| *B62B 9/00* | (2006.01) |
| *B60N 2/56* | (2006.01) |

(52) U.S. Cl.
CPC .......... *G08B 21/02* (2013.01); *B60N 2/5678* (2013.01); *B62B 9/00* (2013.01); *G01K 1/02* (2013.01); *G01K 1/14* (2013.01); *G01W 1/17* (2013.01); *G01K 2215/00* (2013.01)

(58) Field of Classification Search
CPC ........ G08B 21/02; B60N 2/5678; B62B 9/00; G01K 1/02; G01K 1/14; G01K 2215/00; G01W 1/17
See application file for complete search history.

(56) References Cited

U.S. PATENT DOCUMENTS 5,493,716 A * 2/1996 Bane ................. H04W 52/0229
455/229

FOREIGN PATENT DOCUMENTS

WO WO 2017069342 A1 * 4/2017

* cited by examiner

*Primary Examiner* — Omeed Alizada

(57) ABSTRACT

A clippable air condition monitoring device detects air parameters inside an enclosed space below a canopy of an infant carrier. The clippable air condition monitoring device includes a generally U shaped flexible member configured to snap fit on an edge of the canopy, and one or more sensors positioned on the flexible member. The sensors are configured to detect one or more air parameters which determine comfort of an infant seated under the canopy of the infant carrier. In an embodiment, the flexible member is made of an elastic material. In an embodiment, the air parameters comprise one or a combination of temperature, relative humidity and heat index.

12 Claims, 5 Drawing Sheets

CLIPPABLE AIR CONDITION MONITOR DEVICE

FIELD OF THE INVENTION

The present invention relates to a device for monitoring air condition parameters in any infant transport equipment. More particularly, the present invention relates to a clippable air condition monitoring device configured to detect air condition parameters within an enclosed space of an infant carrier.

BACKGROUND

Children of young age, particularly infants, are mostly sensitive to extreme temperature variations. Considering the modern-day temperature conditions, caused predominantly by climate change, pollution, and global warming, it's extremely necessary to ensure an appropriate body temperature of the infant which is in fact a significant aspect of the infant's overall comfort, health and wellbeing.

Infants are usually transported outside in baby strollers, or in specialized car seats designed for infants. Most of such baby strollers are configured to optimize the comfort and security of the infant. In general, to protect an infant from environmental factors such as sunlight, rain, or wind, the modern strollers comprise a partially enclosed or a fully enclosed compartment, where the infant is seated or allowed to lie down. In most cases, the compartment might be bounded by a retractable canopy and may also include a collapsible seating mechanism which allows the infant to sit in a variety of positions. Further, the infant is secured to the stroller via a harnessing mechanism to ensure additional safety during transportation.

However, even though such partially enclosed or fully enclosed compartments provide such benefits to the infant as mentioned above, these compartments may generate an environment where the ambient temperature inside the compartment may vary intensely with respect to the atmospheric conditions. In an example, on a summer day, it is best recommended to secure the infant within the compartment to protect the infant from exposure to the sun rays. But the real problem arises when the temperature within the bounded compartment increases to levels inappropriate for the infant. Considering a similar example, on a winter day, it is best recommended to secure the infant within the compartment to shield the infant from severe wind-chills which might prove to be dangerous to the infant. However, even when the infant is well protected within the multi-layered cladding, the temperature within the bounded compartment may decrease to levels inappropriate for the infant.

Therefore, there is a need for a clippable device which can monitor the air parameters inside the infant carrier where the infant is seated, and provide necessary alerts to the users seated near the infant so that they can provide comfortable alternatives to secure the infant from any harmful temperature conditions inside the infant carrier.

SUMMARY OF THE INVENTION

The clippable air condition monitoring device disclosed here addresses the above-mentioned issues in the background. The clippable air condition monitoring device is configured to detect air parameters inside an enclosed space below a canopy of an infant carrier. The clippable air condition monitoring device comprises a generally U shaped flexible member configured to be positionable on the canopy. For example, in an embodiment, the flexible member is configured to snap fit on an edge of the canopy, and in another embodiment, the flexible member is built into the canopy of the infant carrier as a permanent attachment. The clippable air condition monitoring device further comprises one or more sensors positioned on the flexible member. The sensors are configured to detect one or more air parameters which determine comfort of an infant seated under the canopy of the infant carrier. The clippable air condition monitoring device further comprises a display panel in communication with the sensors to display the air parameters.

In an embodiment, the flexible member is made of an elastic material. In an embodiment, the air parameters comprise one or combination of temperature and relative humidity. In an embodiment, the temperature is measured by a thermostat sensor, and the relative humidity is measured by a relative humidity sensor. In an embodiment, the clippable air condition monitoring device further comprises a pocket to insert batteries to provide power supply to the sensors. In an embodiment, the clippable air condition monitoring device further comprises embedded batteries to provide power supply to the sensors.

In an embodiment, the clippable air condition monitoring device further comprises alarm elements configured to alert users regarding any variation from a threshold air parameter range. In an embodiment, one of the alarm elements is a light emitting diode section, where the light emitting diode section glows to provide the user with a visual cue to perform necessary actions to secure the infant. In an embodiment, another one of the alarm elements is a speaker, where the speaker generates sound signals to provide the user with an audio cue to perform necessary actions to secure the infant.

DETAILED DESCRIPTION OF THE INVENTION

Figure 1A:
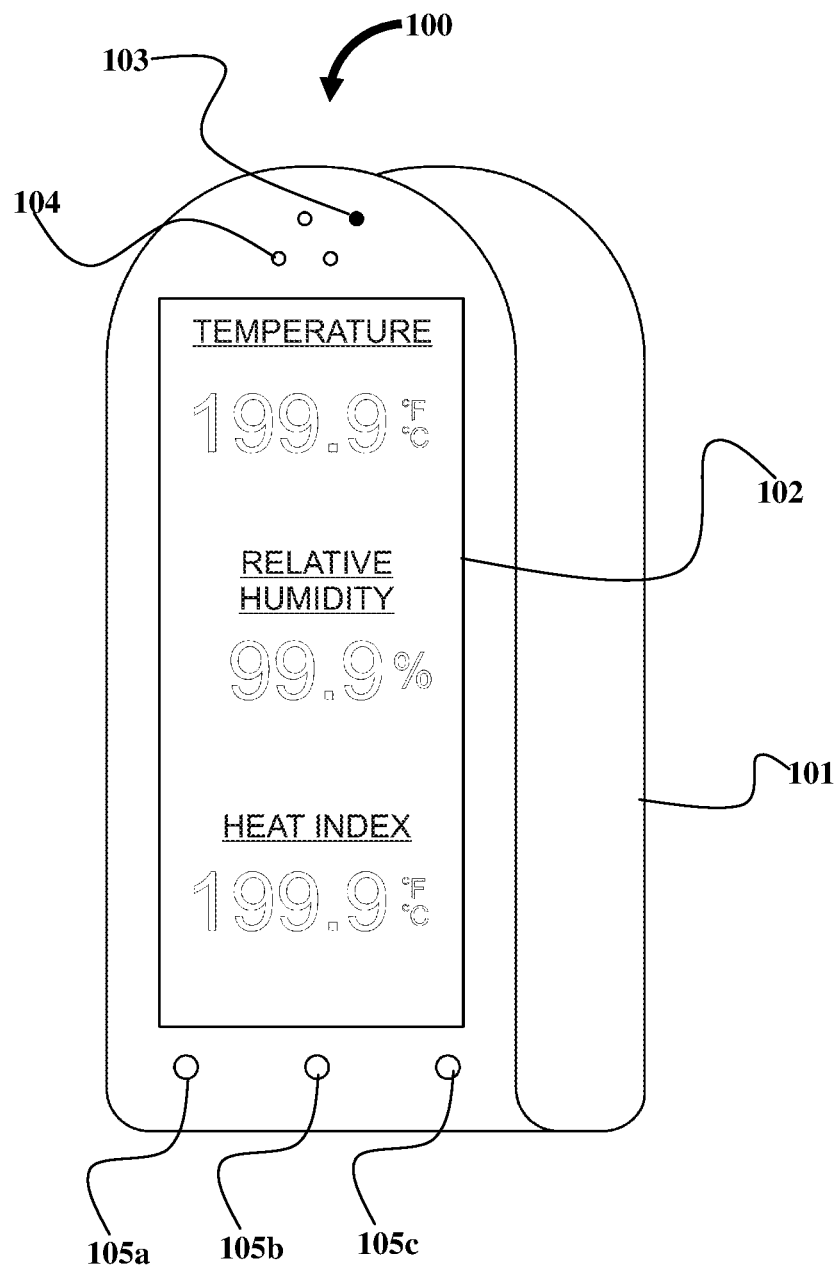
FIG. 1A exemplarily illustrates a front perspective view of the clippable air condition monitoring device.
Figure 1B:
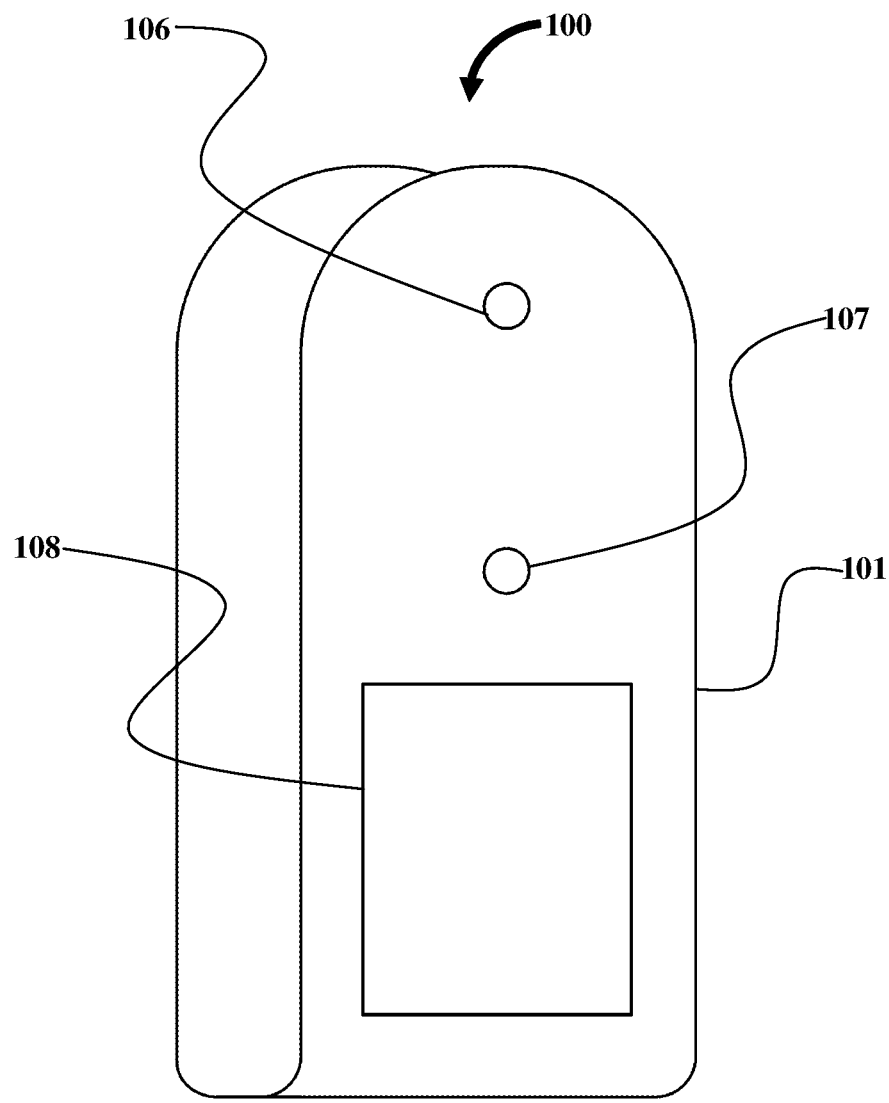
FIG. 1B exemplarily illustrates a rear perspective view of the clippable air condition monitoring device.
Figure 2:
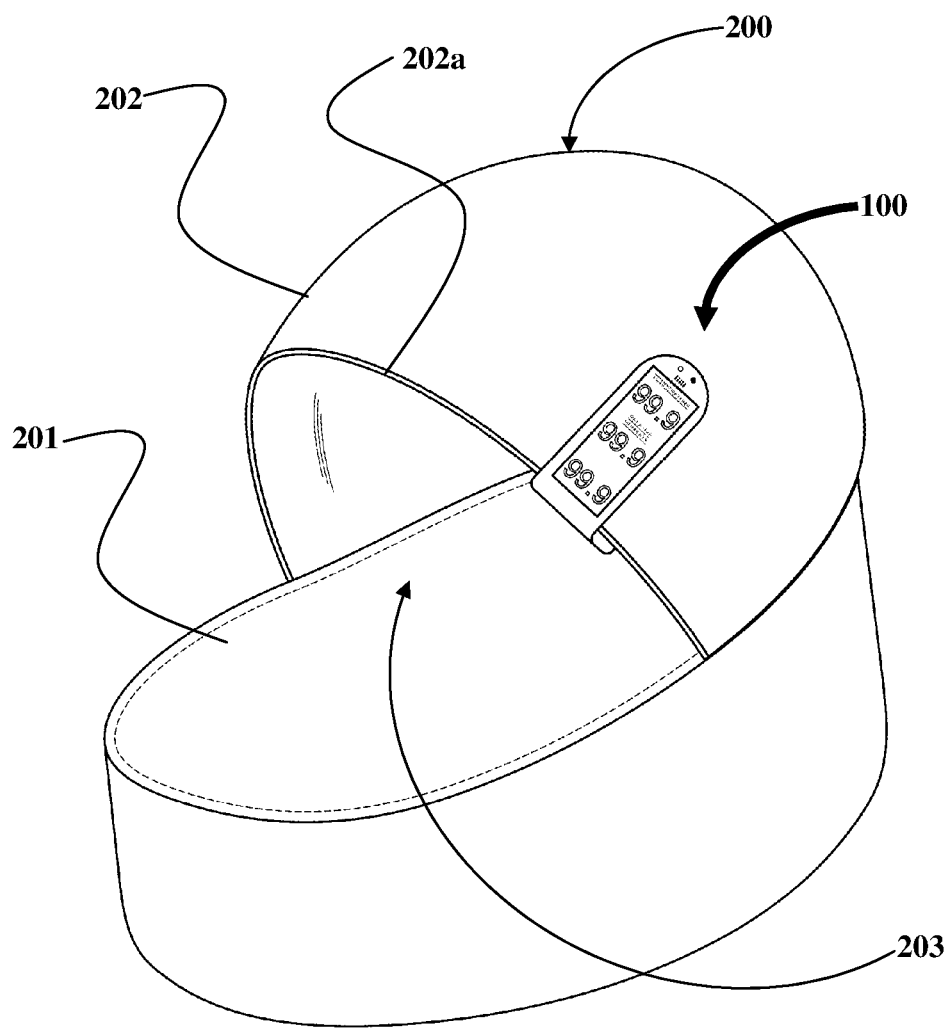
FIG. 2 exemplarily illustrates a top perspective view of the clippable air condition monitoring device positioned on the canopy of an infant carrier.

FIG. 1A exemplarily illustrates a front perspective view of the clippable air condition monitoring device 100, and FIG. 1B exemplarily illustrates a rear perspective view of the clippable air condition monitoring device 100. The clippable air condition monitoring device 100 is configured to detect air parameters inside an enclosed space 203 below a canopy 202 of an infant carrier 200 as shown in FIG. 2. Referring from FIGS. 1A-3, the infant carrier 200 may be, for example, a baby stroller or a car seat designed for infants. In an embodiment, the air parameters comprise one or a combination of temperature, relative humidity, and the heat index which is displayed on the display panel 102 as shown in FIG. 1A. The display panel 102 is in communication with sensors 106 and 107 to display the air parameters as disclosed in FIG. 1B. The temperature, relative humidity and the heat index are important factors when considering the comfort of infants, as it can prove to be harmful to the health of the infants, if not carefully monitored.

The clippable air condition monitoring device 100 is normally clipped onto, or built into a canopy 202 of the infant carrier 200 to measure the temperature, the relative humidity, and the heat index of the air where the infant is seated. A user must be alarmed regarding the condition of the infant, therefore the alarm elements 103 and 104 of the clippable air condition monitoring device 100 are described in the following description. Additional buttons, for example, buttons 105a, 105b and 105c have also been provided for the user to control the power 105a, settings 105b, and alarm on/off 105c.

Figure 3A:
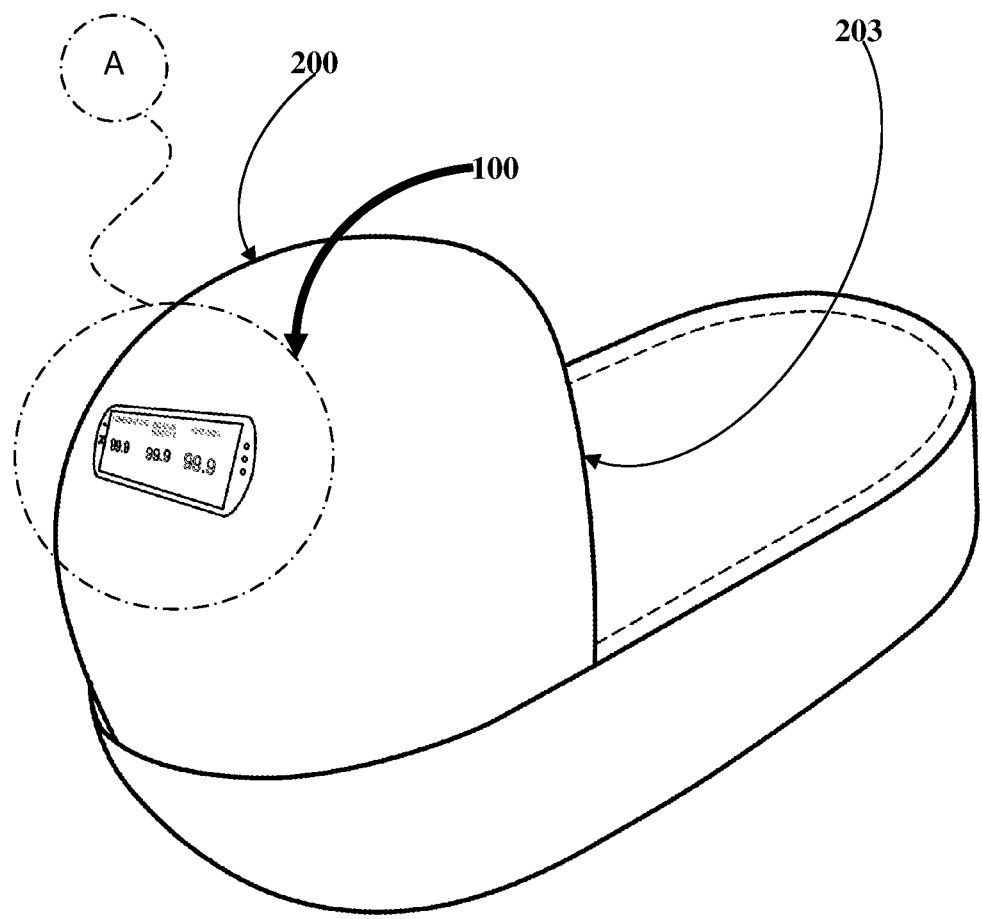
FIG. 3A exemplarily illustrates a top perspective view of the clippable air condition monitoring device built into the infant carrier as a permanent attachment.

Referring to FIGS. 2 and 3A, when the canopy 202 of the infant carrier 200 is deployed, hot air can get trapped within the enclosed space 203 making the localized air more hot and humid than the air outside of the infant carrier 200. This can cause an uncomfortable, or more of an unsafe environment for the infant, and there are no devices in the market which are configured to monitor the air directly where the infant is seated. Therefore, the clippable air condition monitoring device 100 addresses the above-mentioned problems and provides suitable solutions. The clippable air condition monitoring device 100 comprises a generally U shaped flexible member 101 and multiple sensors 106 and 107. The flexible member 101 is configured to be positionable on the canopy 202. For example, in an embodiment, the flexible member 101 is configured to snap fit on an edge 202a of the canopy 202, and in another embodiment, the flexible member 101 is built into the canopy 202 of the infant carrier 200 as a permanent attachment. The clippable air condition monitoring device 100 further comprises sensors 106 and 107 positioned on the flexible member 101. The sensors 106 and 107 detect the air parameters which determine the comfort of an infant seated under the canopy 202 of the infant carrier 200, for example, temperature, relative humidity and heat index.

In an embodiment, the flexible member 101 is made of an elastic material. In an embodiment, the temperature is measured by a thermostat sensor 106, and the relative humidity is measured by a relative humidity sensor 107 as shown in FIG. 1B. As shown in FIG. 1B, in an embodiment, the clippable air condition monitoring device 100 further comprises a pocket 108 to insert batteries to provide power supply to the sensors 106 and 107. The pocket 108 is positioned proximal to the sensors 106 and 107 for easier access. In an embodiment, the clippable air condition monitoring device 100 further comprises embedded batteries to provide power supply to the sensors 106 and 107.

In an embodiment, the clippable air condition monitoring device 100 further comprises alarm elements 103 and 104 configured to alert users regarding any variation from a threshold air parameter range. In an embodiment, one of the alarm elements 103 and 104 is a light emitting diode section 103, where the light emitting diode section 103 glows to provide the user with a visual cue to perform necessary actions to secure the infant. The light emitting diode section 103, or in other words, LEDs light up to indicate a user showing an increase or decrease from a threshold range of temperature or relative humidity which might adversely affect the infant seated inside the infant carrier 200.

Another one of the alarm elements 103 and 104 is a speaker 104, where the speaker 104 generates sound signals to provide the user with an audio cue to perform necessary actions to secure the infant. The audio cue is helpful in the case of a car-seat infant carrier 200. In a car-seat infant carrier 200, if there is only one user who is accompanying the baby, for example, a driving user, then the driving user might not be able to see the LED cue, but can hear the sound from the speaker 104 and make necessary adjustments to secure the infant to a comfortable position.

FIG. 2 exemplarily illustrates a top perspective view of the clippable air condition monitoring device 100 positioned on the canopy 202 of an infant carrier 200. The infant carrier 200 comprises a seat 201 and a canopy 202 which defines the enclosed space 203. The infant is seated on the seat 201 and secured under the canopy 202. Since the clippable air condition monitoring device 100 is made of an elastic material, it is flexible and can be clipped on to any edge 202a of the canopy 202 to detect any air parameter in the enclosed space 203. The thermostat sensor 106, and the relative humidity sensor 107 are positioned on the rear side of the clippable air condition monitoring device 100, so these sensors 106 and 107 are in direct contact with the air inside the enclosed space 203 which facilitates easier sensing of the internal air condition parameters. The front side of the clippable air condition monitoring device 100 faces the outside and enables the user to read the temperature and relative humidity inside the infant carrier 200 via the display panel 102. Therefore, when the user finds any extreme variation in temperature or relative humidity within the enclosed space 203 of the infant carrier 200, he or she can make necessary arrangements to secure the infant from such conditions.

Figure 3B:
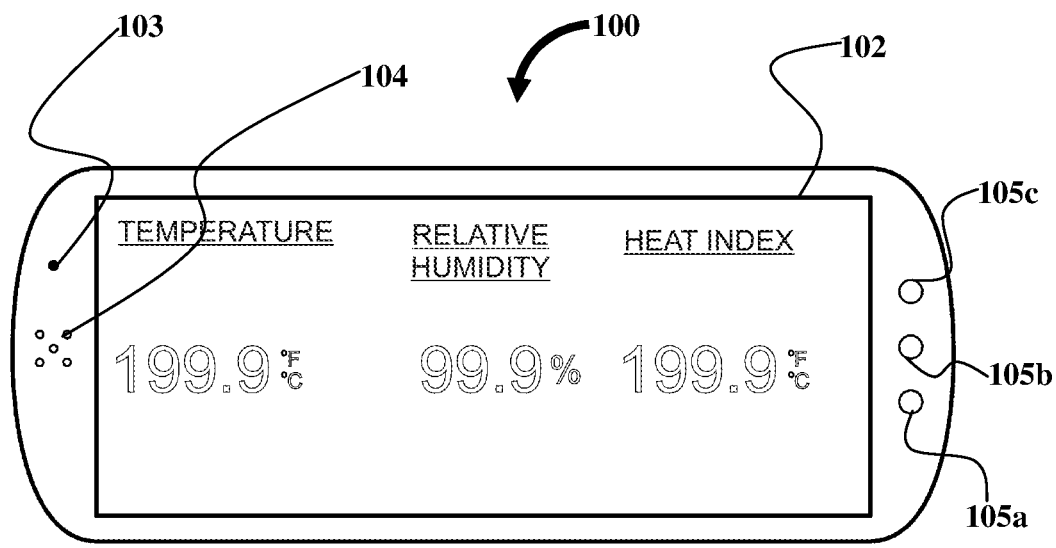
FIG. 3B exemplarily illustrates an enlarged front view of the clippable air condition monitoring device as marked by A in FIG. 3A.
Figure 3C:
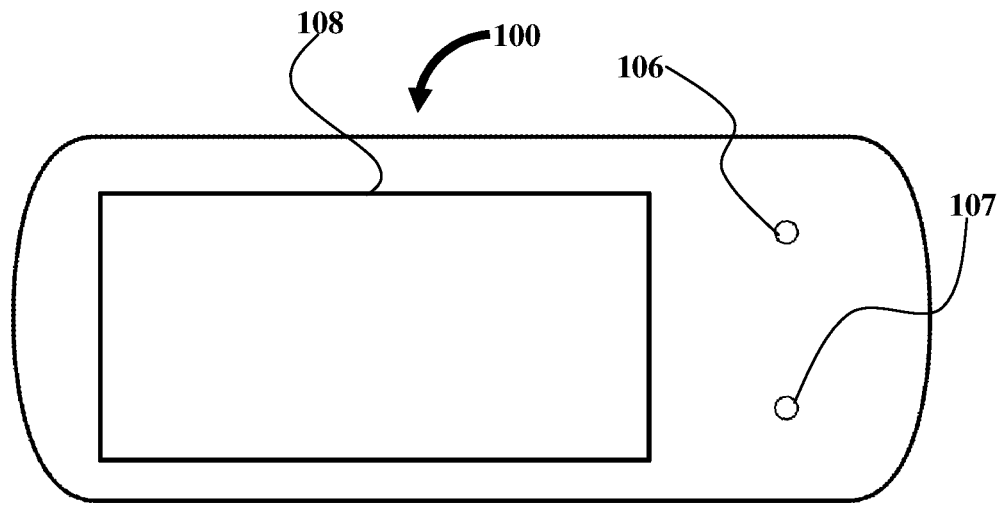
FIG. 3C exemplarily illustrates an enlarged rear view of the clippable air condition monitoring device as marked by A in FIG. 3A.

Referring to FIGS. 3A-3B, FIG. 3A exemplarily illustrates a top perspective view of the clippable air condition monitoring device 100 built into the infant carrier 200 as a permanent attachment. FIG. 3B exemplarily illustrates an enlarged front view of the clippable air condition monitoring device 100 as marked by A in FIG. 3A. FIG. 3C exemplarily illustrates an enlarged rear view of the clippable air condition monitoring device 100 as marked by A in FIG. 3A. In one embodiment, the clippable air condition monitoring device 100 is also built into the infant carrier 200 as a permanent attachment. There are two versions of the clippable air condition monitoring device 100 comprising; (1) a temperature only version, and (2) a temperature and relative humidity version. In another example, both the versions (1) and (2) are either clippable on to the canopy 202 as explained in FIG. 2, or built into the canopy 202 of a car-seat infant carrier 200, or a stroller type infant carrier 200.

In this embodiment shown in FIGS. 3A-3C, the construction is similar to the embodiment in FIG. 2 except for the fact that the clippable air condition monitoring device 100 is attached inside the surface of the canopy 202 of the infant carrier 200. Another differentiating factor is that the display panel 102 and corresponding values, for example, temperature, relative humidity and the heat index, are arranged horizontally along the length of the display panel 102. As shown in FIG. 3B, the front side of the clippable air condition monitoring device 100 faces the outside and enables the user to read the temperature, relative humidity, and heat index inside the enclosed space 203 of the infant carrier 200 via the display panel 102. The control buttons 105a, 105b and 105c are positioned to the right of the display panel 102, and the alarm elements 103 and 104 are generally positioned to the left of the display panel 102. As shown in FIG. 3C, pocket 108 at the rear section is used to insert batteries to provide power supply to the sensors 106 and 107.

The foregoing examples have been provided merely for the purpose of explanation and are in no way to be construed as limiting of the present concept disclosed herein. While the concept has been described with reference to various embodiments, it is understood that the words, which have been used herein, are words of description and illustration, rather than words of limitation. Further, although the concept has been described herein with reference to particular means, materials, and embodiments, the concept is not intended to be limited to the particulars disclosed herein; rather, the concept extends to all functionally equivalent structures, methods and uses, such as are within the scope of the appended claims. Those skilled in the art, having the benefit of the teachings of this specification, may affect numerous modifications thereto and changes may be made without departing from the scope and spirit of the concept in its aspects.

I claim:

1. A clippable air condition monitoring device configured to detect air parameters inside an enclosed space below a canopy of an infant carrier, the clippable air condition monitoring device comprising:
   a generally U shaped flexible member configured to be positionable on the canopy; and
   one or more sensors positioned on the flexible member, wherein the sensors are configured to detect one or more air parameters which determine comfort of an infant seated under the canopy of the infant carrier.

2. The clippable air condition monitoring device of claim 1, further comprising a display panel in communication with the sensors, wherein the display panel is configured to display the air parameters.

3. The clippable air condition monitoring device of claim 1, wherein the flexible member is configured to snap fit on an edge of the canopy.

4. The clippable air condition monitoring device of claim 1, wherein the flexible member is built into the canopy of the infant carrier as a permanent attachment.

5. The clippable air condition monitoring device of claim 1, wherein the flexible member is made of an elastic material.

6. The clippable air condition monitoring device of claim 1, wherein the air parameters comprise one or a combination of temperature, relative humidity and heat index.

7. The clippable air condition monitoring device of claim 1, wherein the temperature is measured by a thermostat sensor, and the relative humidity is measured by a relative humidity sensor.

8. The clippable air condition monitoring device of claim 1, further comprising a pocket to insert batteries to provide power supply to the sensors.

9. The clippable air condition monitoring device of claim 1, further comprising embedded batteries to provide power supply to the sensors.

10. The clippable air condition monitoring device of claim 1, further comprising alarm elements configured to alert users regarding any variation from a threshold air parameter range.

11. The clippable air condition monitoring device of claim 10, wherein one of the alarm elements is a light emitting diode section, wherein the light emitting diode section glows to provide the user with a visual cue to perform necessary actions to secure the infant.

12. The clippable air condition monitoring device of claim 10, wherein one of the alarm elements is a speaker, wherein the speaker generates sound signals to provide the user with an audio cue to perform necessary actions to secure the infant.

* * * * *